US010289594B2

(12) United States Patent
Harpak et al.

(10) Patent No.: US 10,289,594 B2
(45) Date of Patent: May 14, 2019

(54) MULTI-SENSING USING MULTIPLE SERIAL PROTOCOLS OVER A COMMON INTERCONNECTION SCHEME

(71) Applicant: THERANICA BIO-ELECTRONICS LTD., Netanya (IL)

(72) Inventors: Amnon Harpak, Holon (IL); Ofer Rivkind, Modi'in (IL); Ilan Ovadia, Rishon Lezion (IL); Moni Nahear, Revava (IL); Lana Volokh, Haifa (IL)

(73) Assignee: THERANICA BIO-ELECTRONICS LTD., Netanya (IL)

( * ) Notice: Subject to any disclaimer, the term of this patent is extended or adjusted under 35 U.S.C. 154(b) by 0 days.

(21) Appl. No.: 15/736,181

(22) PCT Filed: Jun. 13, 2016

(86) PCT No.: PCT/IB2016/053463
§ 371 (c)(1),
(2) Date: Dec. 13, 2017

(87) PCT Pub. No.: WO2016/203356
PCT Pub. Date: Dec. 22, 2016

(65) Prior Publication Data
US 2018/0189212 A1 Jul. 5, 2018

Related U.S. Application Data

(60) Provisional application No. 62/180,077, filed on Jun. 16, 2015.

(51) Int. Cl.
*G06F 13/40* (2006.01)
*G06F 1/10* (2006.01)
(Continued)

(52) U.S. Cl.
CPC .............. *G06F 13/405* (2013.01); *G06F 1/10* (2013.01); *G06F 13/4282* (2013.01);
(Continued)

(58) Field of Classification Search
None
See application file for complete search history.

(56) References Cited

U.S. PATENT DOCUMENTS 5,999,848 A * 12/1999 Gord .................. A61B 5/14865
607/2
2003/0120271 A1 6/2003 Burnside et al.
(Continued)

FOREIGN PATENT DOCUMENTS

KR 20110120810 A 11/2011

OTHER PUBLICATIONS

An International Search Report and a Written Opinion both dated Sep. I, 2016, which issued during the prosecution of Applicant's PCT/IB2016/053463.
(Continued)

*Primary Examiner* — Idriss N Alrobaye
*Assistant Examiner* — Dayton Lewis-Taylor
(74) *Attorney, Agent, or Firm* — Sughrue Mion, PLLC

(57) ABSTRACT

A multi-sensing system (20) includes multiple sensor units (28) that include respective sensors (44), (ii) are connected to one another in a cascade using serial data lines (32), and (iii) are connected to a common clock line (36) and to a common alignment line (40). The sensor units are configured to selectably communicate in accordance with first and second different serial communication protocols using the same serial data lines, clock line and alignment line. A host (24) is configured to communicate with the sensor units, including reading the sensors and instructing the sensor units to switch between the first and second serial communication protocols.

20 Claims, 3 Drawing Sheets

(51) Int. Cl.
*G06F 13/42* (2006.01)
*G08C 15/06* (2006.01)
*H04Q 9/04* (2006.01)

(52) U.S. Cl.
CPC .............. *G08C 15/06* (2013.01); *H04Q 9/04* (2013.01); *H04Q 2209/30* (2013.01); *H04Q 2209/845* (2013.01)

(56) References Cited

U.S. PATENT DOCUMENTS

2011/0215952 A1* 9/2011 Aria ........................ G06F 3/017
                                                                    341/20
2011/0276738 A1    11/2011 Kim et al.

OTHER PUBLICATIONS

L9780 datasheet—Wide range air fuel sensor control interface. DocID026356 Rev 3 Nov. 2014. (Retrieved from the internet on Sep. I, 2016). Retrieved from the Internet: <http://www.st.com/content/ccc/resource/technical/document/datasheet/42/c9/eb/7c/85/b9/48/fl/DM00116669.pdf/files/DM00116669.pdf/jcr:content/translations/en.DMOO 116669.pdf >STMicroelectronics NV. Nov. 30, 2014 (Nov. 30, 2014).
Communication buses and protocols for sensor networks. Sensors, 2(7), pp. 244-257. (Retrieved from the internet on Sep. I, 2016). Retrieved from the Internet: <http://www.mdpi.net/sensors/papers/s20700244,pdf> Zhou, J. and Mason, A.,Dec. 31, 2002 (Dec. 31, 2002).
U.S. Appl. No. 62/180,077, filed Jun. 16, 2015.

\* cited by examiner

MULTI-SENSING USING MULTIPLE SERIAL PROTOCOLS OVER A COMMON INTERCONNECTION SCHEME

CROSS-REFERENCE TO RELATED APPLICATIONS

This application is the US national phase of International application PCT/IB2016/053463 to Harpak (published as WO 16/203356), filed Jun. 13, 2016, which claims the benefit of U.S. Provisional Patent Application 62/180,077, filed Jun. 16, 2015, the disclosure of both of these applications are incorporated herein by reference.

FIELD OF THE INVENTION

The present invention relates generally to multi-sensing, and particularly to methods and systems for communicating with multiple sensors.

BACKGROUND OF THE INVENTION

Various types of serial communication protocols are used for communication between electronic devices. Some protocols, such as the Serial Peripheral interface (SPI) protocol, are point-to-point protocols between a master and a slave. SPI is used, for example, in microcontrollers, Liquid Crystal Display (LCD) drivers and SD memory cards, to name just a few examples.

Other protocols, such as the Add-Drop Interface (ADI), are synchronous protocols that multiplex time slots of multiple slaves over a common bus. Add and Drop Multiplexers (ADMs) are used, for example, in SDH/SONET networks, as well as in frequency-domain optical networks such as DWDM. ADMs are offered by various manufacturers. One example is the Fujitsu FLM150 ADM.

SUMMARY OF THE INVENTION

An embodiment of the present invention that is described herein provides a multi-sensing system including multiple sensor units and a host. The sensor units (i) include respective sensors, (ii) are connected to one another in a cascade using serial data lines, and (iii) are connected to a common clock line and to a common alignment line. The sensor units are configured to selectably communicate in accordance with first and second different serial communication protocols using the same serial data lines, clock line and alignment line. The host is configured to communicate with the sensor units, including reading the sensors and instructing the sensor units to switch between the first and second serial communication protocols.

In some embodiments, the first serial communication protocol includes a point-to-point master-slave protocol, and the second serial communication protocol includes a synchronous, time-slotted add-drop protocol. In an example embodiment, the first serial communication protocol includes a Serial Peripheral Interface (SN) protocol, and the second serial communication protocol includes an Add-Drop interface (ADI) protocol.

In a disclosed embodiment, the host is configured to configure the sensor units using the first serial communication protocol, and to read the sensors using the second serial communication protocol. In an embodiment, the host is configured to read from the sensors readings that are time-synchronized with one another, based on a timing of the second serial communication protocol.

In another embodiment, a given sensor unit, which includes a given sensor, is configured to receive input data from a previous sensor unit in the cascade, to add to the received input data a reading of the given sensor, and to send the input data and the added reading to a next sensor unit in the cascade. In yet another embodiment, the host and the sensor units are configured to switch between the first and second communication protocols in response to an event, which is available to the host and to the sensor units in both the first and second communication protocols.

There is additionally provided, in accordance with an embodiment of the present invention, a medical probe including multiple sensor units, serial data lines, a common clock line and a common alignment line. The multiple sensor units include respective sensors for sensing a parameter within a body of a patient. The serial data lines are configured to connect the sensor units to one another and to a host in a cyclic cascade. The common clock line and the common alignment line are connected between the host and each of the multiple sensor units. The sensor units are configured to communicate, selectably by the host, in accordance with first and second different serial communication protocols using the same serial data lines, clock line and alignment line.

There is further provided, in accordance with an embodiment of the present invention, a method for multi-sensing. The method includes operating multiple sensor units that (i) include respective sensors, (ii) are connected to one another in a cascade using serial data, lines, and (iii) are connected to a common clock line and to a common alignment line. The sensor units are configurable to selectably communicate in accordance with first and second different serial communication protocols using the same serial data lines, clock line and alignment line. A host communicates with the sensor units, including reading the sensors and instructing the sensor units to switch between the first and second serial communication protocols.

The present invention will be more fully understood from the following detailed description of the embodiments thereof, taken together with the drawings in which:

DETAILED DESCRIPTION OF EMBODIMENT

Overview

Figure 1:
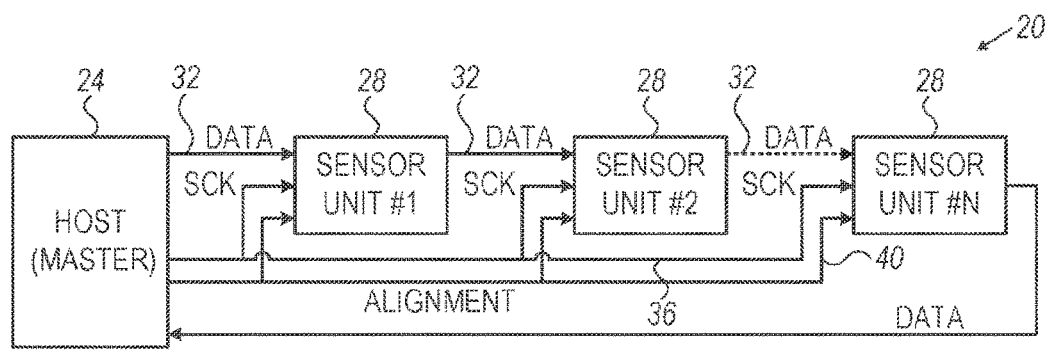
FIG. 1 is a block diagram that schematically illustrates a multi-sensing system, in accordance with an embodiment of the present invention.

Embodiments of the present invention that are described herein provide improved methods and systems for multi-sensing, i.e., for operating and reading multiple sensors. The disclosed techniques can be used, for example, in multi-sensor medical probes, as well as in a wide variety of other applications.

In some embodiments of the present invention, a multi-sensing system comprises multiple sensor units and a host that controls them. The sensor units are connected to one another, and to the host, in a cyclic cascade using serial data lines. In addition, a common clock line and a common timing-alignment line connect the host to the sensor units. In the disclosed techniques, the host communicates with the sensors using two different serial communication protocols, over the same set of data lines, clock line and alignment line.

In some embodiments, the two protocols are SPI and ADI. The ADI protocol is used for reading the sensors, possibly synchronously. The SPI protocol is used for configuring the sensor units. The host decides when to switch from one protocol to the other, and instructs the sensor units accordingly.

The disclosed techniques enable a host to communicate with multiple sensors using a small number of signal lines (e.g., four lines), while reusing the same signal lines and interconnection scheme in both protocols. This solution exploits the unique benefits of each protocol type. The standard SPI protocol is used for control purposes, while API is used for synchronous time-slotted real-time data readout.

SPI and ADI Basics

SPI is essentially a point-to-point bus protocol between two devices—An SPI master and an SPI slave. SPI uses four signals, denoted Chip Select (CS), Serial Clock (SCK), Master-Out Slave-In (MOSI) and Master-In Slave-Out (MISO). The MOSI signal is used for serial data transfer from the master to the slave. The MISO signal is used for serial data transfer from the slave to the master. The CS signal is used for byte, word or packet alignment for the MISO and MOSI data transfer. The SCK signal is used for serial bit timing for the MISO and MOSI data transfer.

One advantage of SPI is that it allows the master and slave to communicate with any protocol without imposing any rules other than byte/word alignment. The SCK signal does not dictate an average data rate, but rather only a temporary burst rate. The synchronous style of SPI reduces overhead and enables a high data rate if needed, up to the SCK rate.

ADI is a multi-slave bus protocol, in which the master allocates time slots to the different slaves in a periodic pattern of time frames. The master synchronizes the slaves to the time frames using a Frame Sync (FS) signal. The physical media for data transfer is an open-drain or open-collector data line that is common to the master and all slaves. The master generals a Serial Clock (SCK) signal that clocks the bits on the data line. Each ADI slave comprises an Add-Drop Multiplexer (ADM) that listens to the data line, receives instructions from the master and adds/drops data during its designated time slots. A given slave (ADM) is aware of the location of its designated time slot relative to the FS signal. The bit rate of the data line (and thus the SCK clock rate) is typically high, since it needs to support the sum of data rates of all staves.

System Description

FIG. 1 is a block diagram that schematically illustrates a multi-sensing system 20, in accordance with an embodiment of the present invention. System 20 comprises a host 24, also referred to as a master, which communicates with multiple sensor units 28. Sensor units 28 typically comprise sensors that measure analog values of some desired physical parameter or parameters. The sensor units convert the measured values into digital words and send the digital words to host 24.

Systems such as system 20 can be used for measuring various types of parameters in various types of applications. In some embodiments, system 20 is used as part of a multi-sensor medical catheter or other medical probe, which is inserted into a patient body and measures multiple parameter values. In one example embodiment, system 20 is used as part of a cardiac catheter that measures the Electro-Physiological (EP) activity at multiple points on the surface of a patient heart. Alternatively, system 20 can be used in various other types of medical probes, for measuring any other suitable types of biological or physiological parameters.

Further alternatively, systems such as system 20 can be used in any other suitable multi-sensing application. Example applications include, but are not limited to, three-dimensional (3D) imaging applications, multi-dimensional mechanical vibration analysis applications, 3D sonar applications, chemical reaction control applications that require simultaneous measurement of several physical parameters (e.g., temperature, pressure and spectroscopy parameters), dynamic multimodality imaging applications, remote (e.g., underwater) cable-based equipment, to name just a few.

As can be seen in FIG. 1, host 24 and sensor units 28 are connected to one another by data lines 32 in a cyclic cascade or loop. The loop of data lines 32 begins at host 24, which sends data to sensor unit #1. Each sensor unit receives data from the previous sensor unit in the cascade (except for sensor unit #1 that receives data from the host) and sends data to the next sensor unit in the cascade (except for sensor unit #N that sends data back to the host).

In addition, host 24 generates a serial clock (SCK) signal and an alignment signal, and provides them in parallel to sensor units 28 over a clock line 36 and an alignment line 40, respectively. The SCK signal is a bit-clock signal that clocks the serial bits sent over data lines 32. The alignment signal is used for higher-level synchronization, such as frame synchronization.

In the present context, data lines 32, clock line 36 and alignment line 40 are referred to collectively as the interconnection scheme between host 24 and sensor units 28. The disclosed interconnection scheme is efficient because it allows the host to communicate with any desired number of sensor units over only four lines. A small number of signal lines is highly advantageous in many applications. In a multi-sensor catheter, for example, the signal lines are routed via the internal lumen of the catheter. A small number of lines means that the catheter can be designed with a large number of sensors, without unnecessarily enlarging the allowed catheter diameter.

In the embodiments described herein, host 24 and sensor units 28 are capable of communicating in accordance with two different serial communication protocols. Alternation between the two protocols is managed by host 24, which instructs sensor unit to switch from one protocol to the other as needed. Both protocols use the same interconnection scheme (data lines 32, clock line 36 and alignment line 40). In other words, no additional signal lines are needed to facilitate the dual-protocol operation.

In the present example, the two protocols are SPI and ADI. Generally, however, any other suitable pair of protocols can be used.

Figure 2:
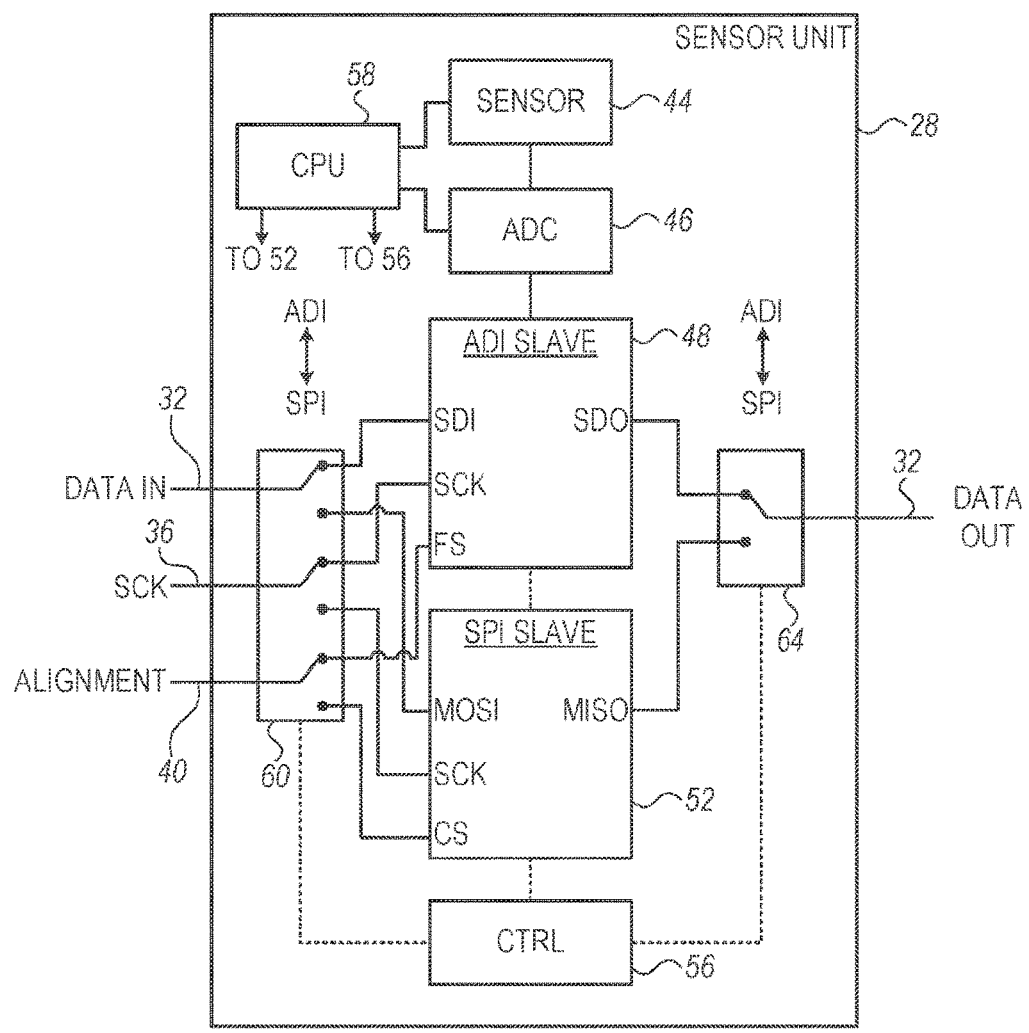
FIG. 2 is a block diagram that schematically illustrates a sensor unit used in the multi-sensing system of FIG. 1, in accordance with an embodiment of the present invention.

FIG. 2 is a block diagram that schematically illustrates the internal structure of one of sensor units 28, in accordance with an example embodiment of the present invention. Typically, all sensor units 28 have a similar internal structure.

In the present example, sensor unit 28 comprises a sensor 44 that measures an analog value of a desired physical parameter. An Analog-to-Digital Converter (ADC) 46 converts the measured analog value into a digital word.

In addition, sensor unit 28 comprises an ADI slave communication module 48 (referred to as "ADI slave" for brevity) for communicating in accordance with the ADI protocol, and an SPI slave module 52 (referred to as "SPI slave" for brevity) for communicating in accordance with the SPI protocol.

A control module 56 manages the operation of sensor unit 28, and in particular switches from one protocol to the other as instructed by host 24. In some embodiments, sensor unit 28 further comprises a Central Processing unit (CPU) 58 that controls sensor 44, ADC 46 and control module 56. CPU 58 is also connected to SPI slave 52.

In the present example, sensor unit 28 comprises an input multiplexer (MUX) 60, which switches the input signals (clock line 36, alignment line 40 and the data input line 32 arriving from the previous sensor unit) to ADI slave 48 or to SPI slave 52. Sensor unit 28 further comprises an output MUX 64, which switches the data output of either ADI slave 48 or SPI slave 52 to the data output line 32 of the sensor unit.

MUXs 60 and 64 are controlled by control module 56. When operating using ADI, data input line 32, clock line 36 and alignment line 40 are routed to the Serial Data. In (SDI), SCK and Frame Sync (FS) inputs of ADI slave 48, respectively. The Serial Data Out (SDO) output of ADI slave 48 is routed to data output line 32. Host 24 acts as an ADI master.

During ADI operation, each ADI slave 48 receives the data signal from the previous ADI slave in the cascade. The received data signal comprises the data added by all preceding ADI slaves. Each ADI slave adds its own data (typically the digitized value of the parameter sensed by its sensor 44) in the appropriate time slot (measured relative to the FS signal), and forwards the data signal to the next ADI slave in the cascade. This store-and-forward technique ensures that, even though each ADI slave is only connected to the previous ADI slave and to the next ADI slave and not to a common data line as in conventional ADI), each ADI slave is still provided with a data line that includes the other time slots. In some embodiments, the store-and-forward technique introduces a delay of one frame per sensor.

In an embodiment, the ADI timing (derived from the FS and SCK signals that are provided to all sensor units) is used for synchronizing the sense times of sensors 44. In other words, system 20 is able to acquire parameter values by different sensors 44 at exactly the same time, by synchronizing to the ADI timing.

Typically, the first time slot in each ADI frame is defined as a command slot. By sending commands in this time slot, host 24 (the master) can control the data format as well as the operational mode (SPI vs. ADI) of the sensor units. One of the commands, for example, instructs the sensor units to switch back to SPI mode.

When operating using SPI, data input line 32, clock line 36 and alignment line 40 are routed to the Master-Out Slave-In (MOSI), SCK and Chip Select (CS) inputs of SPI slave 52, respectively. The Serial Master-In Slave-Out (MISO) output of SPI slave 52 is routed to data output line 32. During SPI operation, host 24 acts as an SPI master. In SPI operation, too, SPI staves 52 perform out store-and-forward over data lines 32. Typically, each SPI slave receives data (e.g., one or more packets) from the previous SPI slave in the cascade, appends its own data (e.g., packet) and sends the packets onwards to the next SPI slave.

In the present example, system 20 uses the ADI protocol for reading data from sensors 44 of the various sensor units 28. The system uses the SPI protocol for configuration changes or other management functions. Such functions may comprise, for example, enumerating the sensor units, assigning ADI time slots to sensor units, setting or adjusting a threshold for a certain action, adding new functionality to a sensor, e.g., frequency analysis, reconfiguring a sensor from differential mode to single ended mode or vice versa, to name just a few possibilities. Typically, host 24 enumerates the sensor units and assigns API time slots to sensor units flexibly, without any hard-wired hardware settings.

In this embodiment, during normal operation host 24 sets sensor units 28 to the ADI mode and reads data from the sensors. When a configuration change or other management operation is called for, host 24 switches sensor units 28 to the SPI mode, performs the desired operation, and returns the sensor units to the ADI mode. The disclosed techniques, however, are not limited to normal operation using ADI and management operation using SPI. In alternative embodiments, host 24 may alternate between ADI and SPI operation based on any other suitable criteria and for performing any other suitable operations.

The configurations of system 20 and sensor unit 28 shown in FIGS. 1 and 2 are example configurations that are depicted purely for the sake of conceptual clarity. In alternative embodiments, any other suitable configurations can be used. For example, system 20 may comprise any suitable number of sensor units. A given sensor unit may comprise more than a single sensor. Sensors 44 in the various sensor units 28 may be identical, or they may be of different types that measure different types of parameters. In some embodiments the sensors are asynchronous, i.e., have no strict requirement for sensing at the same time. In other embodiments the sensors are synchronous, i.e., acquire their sensed values simultaneously or at least with a known timing difference.

Some system and sensor-unit elements that are not mandatory for understanding of the disclosed techniques have been omitted from the figure for the sake of clarity. The different elements of system 20, including the elements of host 24 and sensor units 28, may be implemented using dedicated hardware or firmware, using software, or using a combination of hardware, firmware and/or software elements. Some elements of system 20, e.g., host 24, control modules 56 and/or CPUs 58, may be implemented using one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Example Signal Waveforms and Flow Diagram

Figure 3:
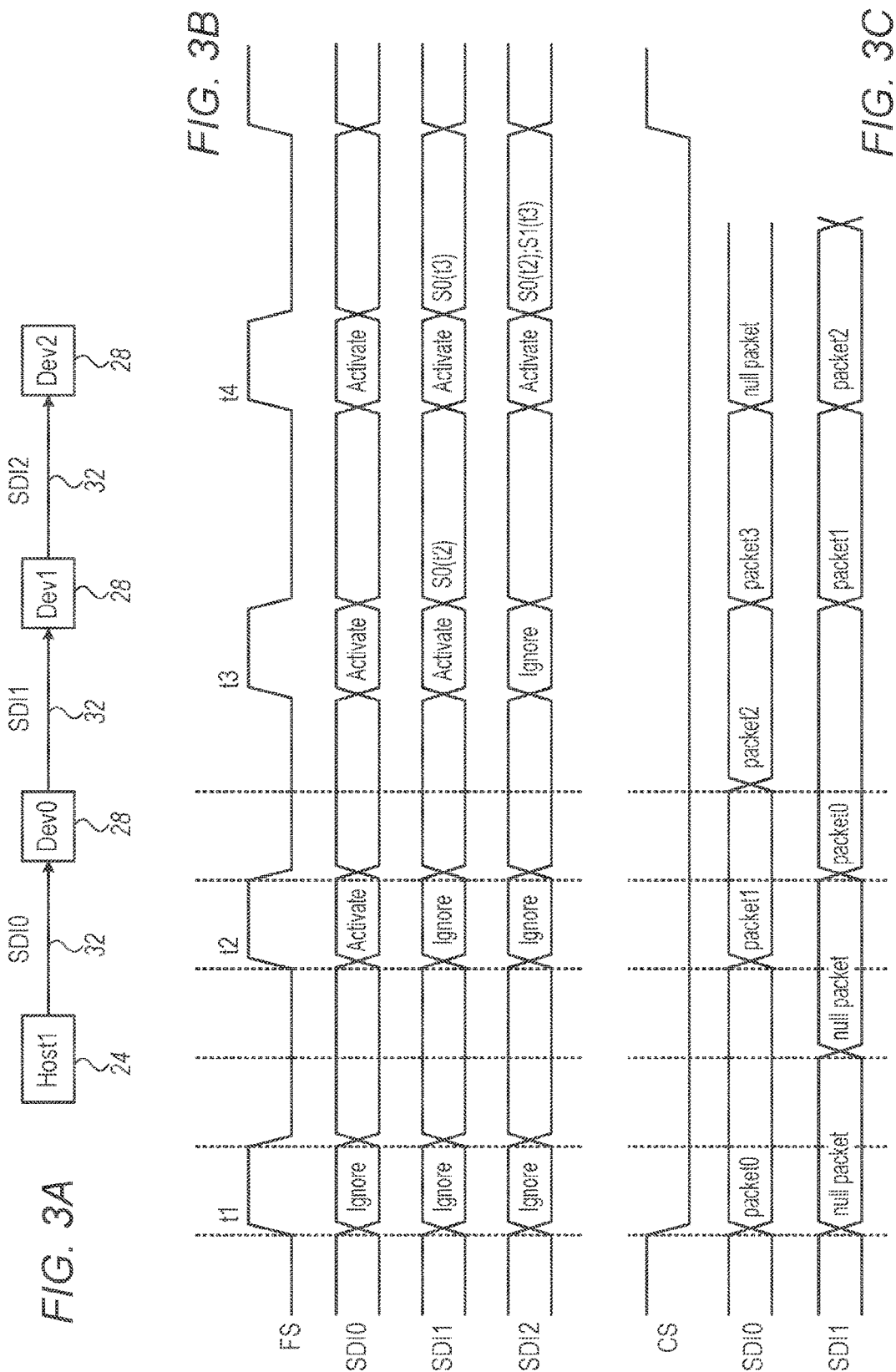
FIG. 3A is a block diagram showing a multi-sensing system, in accordance with an embodiment of the present invention.
FIGS. 3B and 3C are signal diagrams showing ADI and SPI signal waveforms, respectively, in the multi-sensing system of FIG. 3A, in accordance with an embodiment of the present invention.

FIG. 3A is a block diagram showing a multi-sensing system similar to system 20, in accordance with an embodiment of the present invention. In the present example, the system comprises three sensor units denoted Dev0, Dev1 and Dev2. The data line 32 from host 24 to Dev0 is denoted SDI0. The data line 32 from Dev0 to Dev1 is denoted SDI1. The data line 32 from Dev1 to Dev2 is denoted SDI2.

FIG. 3B is a signal diagram showing the signal waveforms on the FS, SDI0, SDI1 and SDI2 lines during ADI operation, in accordance with an embodiment of the present invention. The figure spans four time frames, and demonstrates the store-and-forward functionality of the sensor units, described above.

FIG. 3C is a signal diagram showing the signal waveforms on the FS, SDI0, and SDI1 lines during SPI operation, in accordance with an embodiment of the present invention. The figure again demonstrates the store-and-forward functionality of the sensor units.

Figure 4:
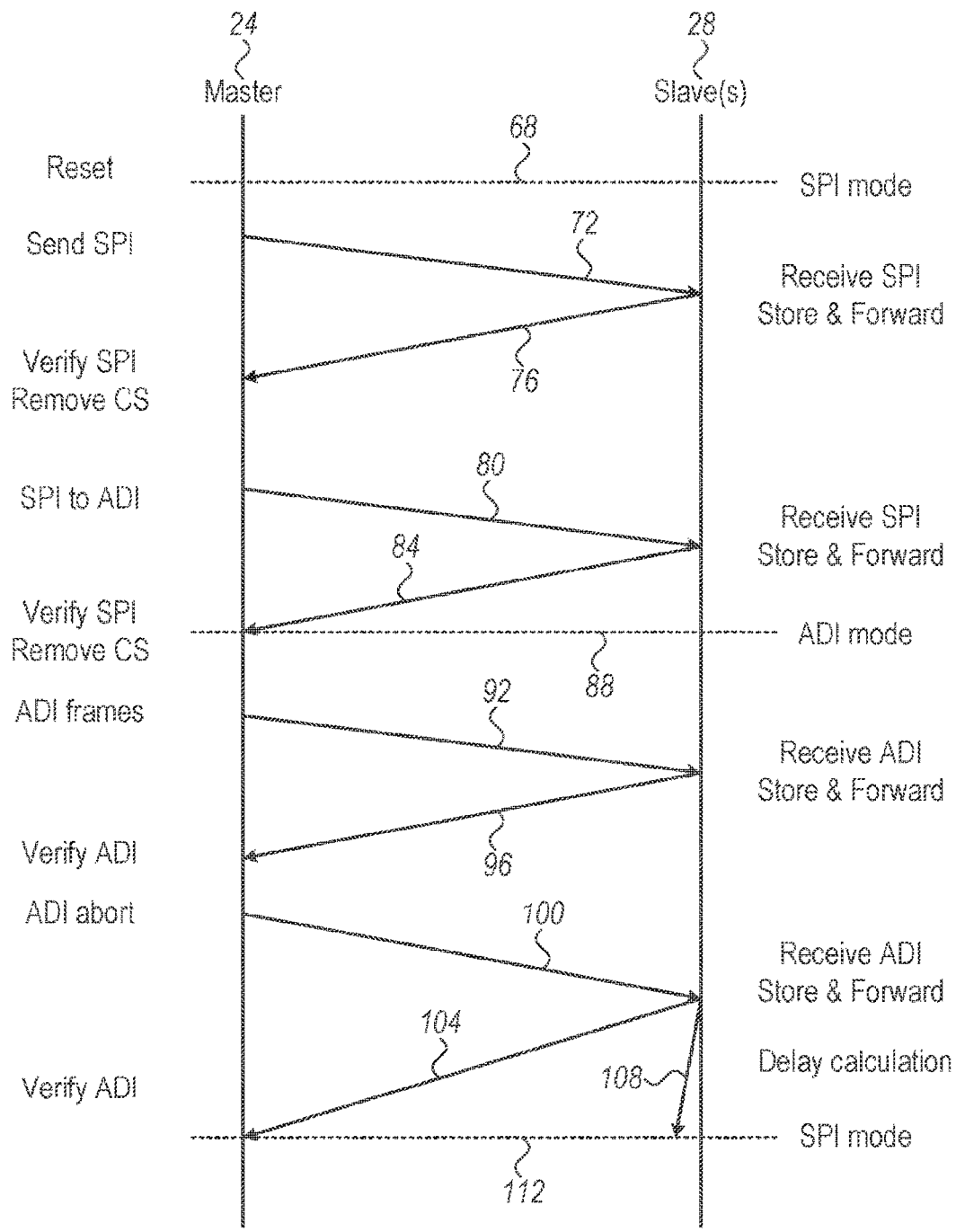
FIG. 4 is a diagram that schematically illustrates a method for alternating between SPI and ADI protocols on a common set of interconnections, in accordance with an embodiment of the present invention.

FIG. 4 is a diagram that schematically illustrates a method for alternating between SPI and ADI protocols, in accordance with an embodiment of the present invention. In the present example, the default mode in which host 24 and sensor units 28 wake-up upon reset, at a time 68, is SPI.

At an SPI transfer step 72, host 24 sends SPI data to sensor units 28. The SPI data may comprise, for example, setup and configuration instructions and information. Control modules 56 in sensor units 28 receive the data, act upon it, and store-and-forward the data onwards along the cascade. At a host SPI reception step 76, the last sensor unit 28 in the cascade sends the SPI data to host 24. The host verifies the data and removes (de-asserts) the CS signal.

When needed, host 24 sends sensor units 28 a command to switch from SPI to ADI, at an SPI-to-ADI instruction step 80. Control modules 56 of sensor units 28 propagate the command to one another along the cascade. Each control module also switches its respective sensor unit from SPI to ADI (e.g., using MUXs 60 and 64 of FIG. 2). At an SPI-to-ADI host receiving step 84, the host receives the propagated command from the last sensor unit in the cascade, concludes that all sensor units have switched to ADI, and removes the CS signal. Thus, at a time 88, the entire system has switched from SPI to ADI.

At an ADI transfer step 92, host 24 generates ADI frames to sensor units 28. Each sensor unit 28 reads its sensor 44, adds the sensor data in its designated time slot relative to the FS signal, and stores-and-forwards the resulting data signal to the next sensor unit in the cascade. At an ADI host reception step 96, host 96 receives the ADI frames from the last sensor unit in the cascade, and extracts the data sensed by the various sensors.

When appropriate, host 24 sends sensor units 28 a command to switch from ADI to SPI, at an ADI aborting step 100. Control modules 56 of sensor units 28 propagate the command to one another along the cascade. Each control module also switches its respective sensor unit from ADI to SPI (e.g., using MUXs 60 and 64 of FIG. 2). At an ADI-to-SPI host receiving step 104, host 24 receives the propagated command from the last sensor unit in the cascade, and concludes that all sensor units have switched to SPI.

When using the disclosed configuration, switching between SPI and ADI is smooth and seamless. In a given sensor unit 28, control module 56 switches from SPI to ADI in response to de-assertion of the CS signal. Switching from ADI to SPI, in a given sensor unit 28, is performed M frames after receiving the appropriate ADI command. M is calculated per sensor unit 28, based on its time-slot assignment and the total number of time slots in a frame. (This feature is depicted by the "delay calculation" arrow 108 in the figure.)

Thus, at a time 112, the entire system has switched from ADI to SPI. Typically, host 24 also plays the role of the last slave in the cascade, and its switching mechanism is therefore also aligned to those of sensor units 28. Generally speaking, host 24 and sensor units 28 typically switch between SPI and ADI synchronously, in response to an event that is available to the host and to the sensor units in both SPI and ADI.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A multi-sensing system, comprising:
   multiple sensor units, which (i) comprise respective sensors, (ii) are connected to one another in a cascade using serial data lines, and (iii) are connected to a common clock line and to a common alignment line, wherein the sensor units are configured to selectably communicate in accordance with first and second different serial communication protocols using the same serial data lines, clock line and alignment line, and wherein the first serial communication protocol comprises a point-to-point master-slave protocol, and wherein the second serial communication protocol comprises a synchronous, time-slotted add-drop protocol; and
   a host, which is configured to communicate with the sensor units, including reading the sensors and instructing the sensor units to switch between the first and second serial communication protocols.

2. The system according to claim 1, wherein the first serial communication protocol comprises a Serial Peripheral Interface (SPI) protocol, and wherein the second serial communication protocol comprises an Add-Drop Interface (ADI) protocol.

3. A multi-sensing system, comprising:
   multiple sensor units, which (i) comprise respective sensors, (ii) are connected to one another in a cascade using serial data lines, and (iii) are connected to a common clock line and to a common alignment line, wherein the sensor units are configured to selectably communicate in accordance with first and second different serial communication protocols using the same serial data lines, clock line and alignment line; and
   a host, which is configured to communicate with the sensor units, including reading the sensors and instructing the sensor units to switch between the first and second serial communication protocols,
   wherein the host is configured to configure the sensor units using the first serial communication protocol, and to read the sensors using the second serial communication protocol.

4. The system according to claim 3, wherein a given sensor unit, which comprises a given sensor, is configured to receive input data from a previous sensor unit in the cascade, to add to the received input data a reading of the given sensor, and to send the input data and the added reading to a next sensor unit in the cascade.

5. The system according to claim 3, wherein the host and the sensor units are configured to switch between the first and second communication protocols in response to an event, which is available to the host and to the sensor units in both the first and second communication protocols.

6. A multi-sensing system, comprising:
multiple sensor units, which (i) comprise respective sensors, (ii) are connected to one another in a cascade using serial data lines, and (iii) are connected to a common clock line and to a common alignment line, wherein the sensor units are configured to selectably communicate in accordance with first and second different serial communication protocols using the same serial data lines, clock line and alignment line; and
a host, which is configured to communicate with the sensor units, including reading the sensors and instructing the sensor units to switch between the first and second serial communication protocols,
wherein the host is configured to read from the sensors readings that are time-synchronized with one another, based on a timing of the second serial communication protocol.

7. The system according to claim 1, wherein a given sensor unit, which comprises a given sensor, is configured to receive input data from a previous sensor unit in the cascade, to add to the received input data a reading of the given sensor, and to send the input data and the added reading to a next sensor unit in the cascade.

8. The system according to claim 1, wherein the host and the sensor units are configured to switch between the first and second communication protocols in response to an event, which is available to the host and to the sensor units in both the first and second communication protocols.

9. The system according to claim 6, wherein a given sensor unit, which comprises a given sensor, is configured to receive input data from a previous sensor unit in the cascade, to add to the received input data a reading of the given sensor, and to send the input data and the added reading to a next sensor unit in the cascade.

10. The system according to claim 6, wherein the host and the sensor units are configured to switch between the first and second communication protocols in response to an event, which is available to the host and to the sensor units in both the first and second communication protocols.

11. A method for multi-sensing, comprising:
operating multiple sensor units, which (i) comprise respective sensors, (ii) are connected to one another in a cascade using serial data lines, and (iii) are connected to a common clock line and to a common alignment line, wherein the sensor units are configurable to selectably communicate in accordance with first and second different serial communication protocols using the same serial data lines, clock line and alignment line, and wherein the first serial communication protocol comprises a point-to-point master-slave protocol, and wherein the second serial communication protocol comprises a synchronous, time-slotted add-drop protocol; and
using a host, communicating with the sensor units, including reading the sensors and instructing the sensor units to switch between the first and second serial communication protocols.

12. The method according to claim 11, wherein the first serial communication protocol comprises a Serial Peripheral Interface (SPI) protocol, and wherein the second serial communication protocol comprises an Add-Drop Interface (ADI) protocol.

13. The method according to claim 11, and comprising, in a given sensor unit that comprises a given sensor, receiving input data from a previous sensor unit in the cascade, adding to the received input data a reading of the given sensor, and sending the input data and the added reading to a next sensor unit in the cascade.

14. The method according to claim 11, and comprising switching between the first and second communication protocols in response to an event, which is available to the host and to the sensor units in both the first and second communication protocols.

15. A method for multi-sensing, comprising:
operating multiple sensor units, which (i) comprise respective sensors, (ii) are connected to one another in a cascade using serial data lines, and (iii) are connected to a common clock line and to a common alignment line, wherein the sensor units are configurable to selectably communicate in accordance with first and second different serial communication protocols using the same serial data lines, clock line and alignment line; and
using a host, communicating with the sensor units, including reading the sensors and instructing the sensor units to switch between the first and second serial communication protocols,
wherein communicating with the sensor units comprises configuring the sensor units using the first serial communication protocol, and reading the sensors using the second serial communication protocol.

16. The method according to claim 15, and comprising, in a given sensor unit that comprises a given sensor, receiving input data from a previous sensor unit in the cascade, adding to the received input data a reading of the given sensor, and sending the input data and the added reading to a next sensor unit in the cascade.

17. The method according to claim 15, and comprising switching between the first and second communication protocols in response to an event, which is available to the host and to the sensor units in both the first and second communication protocols.

18. A method for multi-sensing, comprising:
operating multiple sensor units, which (i) comprise respective sensors, (ii) are connected to one another in a cascade using serial data lines, and (iii) are connected to a common clock line and to a common alignment line, wherein the sensor units are configurable to selectably communicate in accordance with first and second different serial communication protocols using the same serial data lines, clock line and alignment line; and
using a host, communicating with the sensor units, including reading the sensors and instructing the sensor units to switch between the first and second serial communication protocols,
wherein reading the sensors comprises reading from the sensors readings that are time-synchronized with one another, based on a timing of the second serial communication protocol.

19. The method according to claim 18, and comprising, in a given sensor unit that comprises a given sensor, receiving input data from a previous sensor unit in the cascade, adding to the received input data a reading of the given sensor, and sending the input data and the added reading to a next sensor unit in the cascade.

20. The method according to claim 18, and comprising switching between the first and second communication protocols in response to an event, which is available to the host and to the sensor units in both the first and second communication protocols.

* * * * *